United States Patent
Dubois et al.

(10) Patent No.: US 9,748,776 B2
(45) Date of Patent: Aug. 29, 2017

(54) APPARATUS FOR STORING AND RELEASING ELECTRICAL ENERGY USING A FLYWHEEL AND A PLURALITY OF ELECTROCHEMICAL ACCUMULATORS

(71) Applicant: SOCPRA SCIENCES ET GÉNIE S.E.C., Sherbrooke (CA)

(72) Inventors: Maxime Dubois, Levis (CA); Philippe Beauchamp, Quebec (CA); Rami Jarjour, Quebec (CA)

(73) Assignee: SOCPRA SCIENCES ET GENIE S.E.C., Sherbrooke (CA)

( * ) Notice: Subject to any disclaimer, the term of this patent is extended or adjusted under 35 U.S.C. 154(b) by 93 days.

(21) Appl. No.: 14/427,643

(22) PCT Filed: Sep. 13, 2013

(86) PCT No.: PCT/CA2013/000777
§ 371 (c)(1),
(2) Date: Mar. 12, 2015

(87) PCT Pub. No.: WO2014/040172
PCT Pub. Date: Mar. 20, 2014

(65) Prior Publication Data
US 2015/0249352 A1    Sep. 3, 2015

Related U.S. Application Data

(60) Provisional application No. 61/700,524, filed on Sep. 13, 2012.

(51) Int. Cl.
*H02J 7/00* (2006.01)
*F03G 3/08* (2006.01)
(Continued)

(52) U.S. Cl.
CPC ............. *H02J 7/0018* (2013.01); *F03G 3/08* (2013.01); *H02J 7/007* (2013.01); *H02J 7/1423* (2013.01); *H02J 15/00* (2013.01); *H02J 7/0014* (2013.01)

(58) Field of Classification Search
CPC ............. H02J 7/0031; H02J 2007/004; H02J 2007/0037; Y02E 60/12; H01M 10/48
(Continued)

(56) References Cited

U.S. PATENT DOCUMENTS 6,441,581 B1    8/2002  King et al.
2001/0049571 A1*  12/2001  Shimizu .................. B60K 6/28
                                                                  701/22
(Continued)

FOREIGN PATENT DOCUMENTS

| JP | 01-050778 A | 2/1989 |
| JP | 02-016344 A | 1/1990 |
| JP | 2000-023314 A | 1/2000 |

*Primary Examiner* — Arun Williams
(74) *Attorney, Agent, or Firm* — Fasken Matineau Dumoulin LLP

(57) ABSTRACT

An apparatus for transferring energy from cell to cell of a battery, wherein each cell is connected to its individual electrical motor/alternator through an electronic module, and wherein each motor/alternator is mechanically connected to a common flywheel. The electrical motor/alternator preferably is an electrical motor that provides rotational work and generates power when being driven by an external source of rotational kinetic energy or by an external source of rotational power. The common flywheel stores rotational kinetic energy. Cells of the battery provide various torque on the flywheel or on the shaft driving the flywheel. Cells with higher than average output current will provide higher than average torque, thus providing higher than average kinetic energy input to the flywheel, while cells with lower than average output current will provide lower than average
(Continued)

torque, or will provide negative torque, the motor/alternator acting then as an alternator recharging the cell.

20 Claims, 11 Drawing Sheets

(51) Int. Cl.
  *H02J 15/00* (2006.01)
  *H02J 7/14* (2006.01)
(58) Field of Classification Search
  USPC .......................................................... 320/134
  See application file for complete search history.

(56) References Cited

U.S. PATENT DOCUMENTS

2003/0214826 A1\* 11/2003 Zhu .................... B60L 11/12
   363/132
2005/0248321 A1   11/2005 Liu et al.
2010/0188040 A1\*  7/2010 Reed .................... H02J 7/02
   320/107

\* cited by examiner

APPARATUS FOR STORING AND RELEASING ELECTRICAL ENERGY USING A FLYWHEEL AND A PLURALITY OF ELECTROCHEMICAL ACCUMULATORS

FIELD OF INVENTION

This invention generally relates to the equalization of charges between a plurality of rechargeable electrochemical accumulators connected to a system and to dampen the energy transfer from the plurality of electrochemical accumulators to an external system in a bidirectional manner.

BACKGROUND OF INVENTION

Today, electricity is becoming one of the most popular energy sources for green transportation. Cars, trains, bicycles, boats, tramways, buses are all turning to battery powered drive train. Electrochemical accumulators (batteries) are usually considered the most practical means of energy storage and in today's transport vehicles, they are leading the market. Batteries are often composed of a string of individual electrochemical cells, also called electrochemical accumulators for the purpose of this invention. As can be understood by a person skilled in the art, electrochemical cells or accumulators include a wide variety of accumulators, including, without restrictions, lead-acid batteries, nickel-metal hydride batteries, lithium ion batteries and energy accumulating capacitors.

Depending on its chemical and atomic constitution, the voltage of an electrochemical cell is often comprised within the range of 1 to 4 volts. In the transportation domain, power requirements are very high and would imply destructive currents flowing through electrical components at such voltage ($P=V*I$). The transportation industry usually counters this problem by connecting multiple cells in a serial fashion thus increasing the voltage and reducing the current requirements to an acceptable level. In such a configuration, the total current circulating in the battery (string of cells) is the same in every cell.

A cell can be conceptualized as an ideal cell with a serial internal resistor. Any current flowing through this arrangement creates heat losses ($P=R*I^2$). Since all cells are unique due to their exact atomic structure, their own internal defects and because of limitations to the manufacturing processes accuracy, their electrical characteristics are unique as well. Therefore, each cell has its own capacity, voltage and equivalent internal resistor.

This irregularity raises many problems in batteries (string of cells): for a determined current, each cell won't show the same heat losses; the full charge voltage is different for each cell; the capacity is different for each cell; the rate of charge or discharge is different for each cell. Moreover, failure of a single cell can result in a general failure of the battery.

For example, in applications related to the transportation field, electrical loads fluctuate greatly in terms of energy drained or generated during acceleration and braking. Typically, in a hybrid vehicle, the load on the battery comes from an electric traction motor that shows dynamic behavior such that average power requirement is a fraction of the peak power in transient situations. For example, the acceleration of a small car will drain a peak power in the range of 25 kW, maintaining a constant speed drain of 6 kW and braking generates 12 kW. For a car battery pack with voltage around 200 volts, the current associated with peak demands is around 125 amps. Due to their internal irregularities, such current in batteries will result in wide spread performance and electrical characteristics within each cell.

The individual electrical characteristics of each cell define its optimal operating conditions, which varies from cell to cell. To maximize the life span of each cell, it is thus preferable to operate each cell, or alternatively a plurality of groups of cells, near their individual optimal operating conditions. In each case, cells or group of cells will have maximal desired charge and discharge rates in order to maximize their life span as a function of the application for which the battery is used.

It is well known that a flywheel can be used to temporarily store energy surges, for example in case of recuperative dynamic braking of gas-electric vehicles. The energy from the flywheel can then be gradually released to a battery via an alternator. Conversely, it is also well known that a flywheel which has accumulated kinetic energy from a motor fed by batteries can rapidly release such kinetic energy, for example during the acceleration of a vehicle. For example, in a hybrid gas-electric vehicle, a flywheel allows one to reduce peaks of current intensity in the charge cycles (during recuperative dynamic braking) and discharge cycles (during acceleration) of the battery. In such cases, the flywheel effectively dampens the peaks of the charge and discharge cycles of the system.

However, one of the problems is that it is difficult to operate batteries in conditions where each individual cell is operated near its optimal conditions. Another difficulty is to provide for a method to equalize the charges between cells of a battery in the event that one or several of the cells have accumulated a charge above or below the average for the cells of the battery. In general, in the prior art, another problem arises when cells are connected in a serial fashion, which is failure of a single cell results in general failure of the whole battery.

SUMMARY OF THE INVENTION

It is an object of the present invention to provide an apparatus for transferring energy from cell to cell of a battery comprising a plurality of cells, wherein each cell is connected to its individual electrical motor/alternator through an electronic module, and wherein each motor/alternator is mechanically connected to a common flywheel. The electrical motor/alternator preferably is an electrical motor that provides rotational work and generates power (current and voltage) when being driven by an external source of rotational kinetic energy or as the case may be, by an external source of rotational power. Each of said motors/alternators is connected to a common flywheel which stores rotational kinetic energy. Cells of the battery will provide, through their associated motors/alternators units, various torque on the flywheel or on the shaft driving the flywheel, as the case may be. Cells with higher than average output current will provide higher than average torque, thus providing higher than average kinetic energy input to the flywheel, while cells with lower than average output current will provide lower than average torque, thus providing lower than average kinetic input to the flywheel. Alternatively, cells with lower than average output current will provide negative torque, the motor/alternator acting then as an alternator recharging the cell. Thus, cells with lower than average output will be recharged by their motors/alternators, by the energy being transferred to the flywheel by all other cells. Cells with higher than average output will discharge more quickly than the average cells, as they will provide higher torque output to the flywheel. After a period of time, there will be an equalization of the charges between the cells. Such equalization can be active and continuous over the duration of other operations of the cells and the battery. The apparatus also comprises external electrical connectors to allow charging and discharging external systems.

It is another object of the present invention that the battery of cells be electrically connected to an external system in a parallel fashion with the plurality of motors/alternators. This system can provide electrical energy input or output to the present invention, or can alternate sequences of energy input and output, depending on the application. In the case of electrical energy input, if the charge provided by the external system exceeds the desired charging rate of the cells, excess energy is transferred to the motor/alternator of each cells, and then converted in rotational kinetic energy of the flywheel. Once the energy input ceases to exceed the desired charge rate of the cells, the kinetic energy of the flywheel may be used to drive the motors/alternators in alternator mode, to continue charging the cells of the battery after the external system ceases providing energy above the desired charge rate of the cells. In such mode, the flywheel of the invention therefore acts as a damper to temporarily store energy from the external system to avoid charge rates from exceeding the desired charge rate for each cell, while returning this energy to the cells through the motors/alternators afterward.

It is yet another object of the present invention that energy from the cells can be transferred to the flywheel by the motors/alternators acting in a motor mode, so that part of the energy from each cell is transformed into rotational kinetic energy of the flywheel. In the event a surge output of electrical energy is required by the external system, above the desired discharge rate of the cells of the battery, then energy from the flywheel can be transferred into electrical energy by the motors/alternators in a motor mode and then outputted as electrical energy to the external system. In such mode, the flywheel of the invention therefore temporarily stores energy from the battery of cells and provides for rapid release of this energy to the external system when the required output to the external system exceeds the desired discharge rate of the cells, therefore increasing the peak power output from the invention to the external system.

It is yet another object of the present invention that converters can be used to convert alternative current (AC) from the alternator (the motor when being driven by an external source of rotational kinetic energy or as the case may be, by an external source of rotational power) to direct current (DC) for a cell. Conversely, converters can be used to convert DC current from a cell to AC current to supply the motor. Such DC/AC converter module may be integrated to each motor/alternator unit or can alternatively form separate elements of the invention, wherein each motor/alternator is associated with one DC/AC converter. Each cell is connected to its associated motor/alternator through an electronic module which contains the converter. The electronic module circuitry may also incorporate elements to measure electrical characteristics of the cells, in order to send this measured information to a power management unit. The power management unit may be used to optimize the energy transfers between each cell and its associated motor/alternator as a function of the desired energy transfer to and from the flywheel and of the desired maximal charge and discharge rates of each cell. The power management unit may also utilize other measured physical properties of the cells and of the different components of the invention, such as the temperature of individual cells, in order to optimize the life span of cells. Converter modules, being controlled by the power management unit, can further serve to adjust current and voltage between the motor/alternator and the associated battery cell as a function of the measured electrical and physical properties of the cells and of the desired charge and discharge rates.

It is yet another object of the present invention that failed cells (under or over voltage, under or over temperature, internal short circuit, etc.) may be disconnected from the battery, without compromising the functionality of the battery. In such case, the motor/alternator associated with the failed cell would act as an alternator while the motors/alternators associated with healthy cells would act as motors, thus transferring power from the healthy cells to the electronic modules of the failed cells, and generating the voltage of the disconnected failed cells. Under such configuration, battery voltage remains within an acceptable level for the external system connected to the battery despite failed cells within the battery.

In an alternative form of the invention, motors/alternators operating in DC mode may be used, therefore alleviating the need for a DC/AC converter. In such embodiment, a DC/DC converter may be used and an electronic module measures electrical characteristics of the cells and to send measured information to a power management unit. Electronic modules, being controlled by the power management unit, can further serve to adjust current and voltage between the motor/alternator and the associated battery cell as a function of the measured electrical and physical properties of the cells and of the desired charge and discharge rates.

In another alternative form of the invention, motors/alternators operating in DC mode may be used without a DC/AC converter. In such embodiment, motors/alternators may be connected directly to each cell without any electronic module. This embodiment allows direct dynamic balancing of the cells since DC motors/alternators rotational speeds are directly linked to their stator voltage.

In some applications of the invention, the external system can be an electrical motor that provides rotational work and which also generates current when being driven by an external source of rotational kinetic energy. In other applications of the present invention, the external system may include an alternator, a rectifying circuit, a motor and a control circuit, whereas the external system may provide input and output of electrical energy to the invention.

In an alternative form of the invention, a plurality of cells are connected together in a serial or parallel fashion, or alternatively a combination of serial and parallel, in order to form groups of cells (each said group of cells forming a battery which is a sub-assembly of the overall battery of the invention), each said group of cells being associated with a single electronic module and a single motor/alternator. Each of said motor/alternator is then connected to a common flywheel. This configuration provides for the transfer of energy to and from each group of cells, so that charges are equalized between said battery sub-assemblies instead of individual cells, and wherein each group of cell interacts with its associated motor/alternator and electronic module as if it was a single cell for every other aspect of the present invention.

In accordance with some embodiments of the present invention, each of the motors/alternators directly driving the same flywheel, by means of gears, chains, belts and pulleys or other such mechanical connections. Alternatively, the motors/alternators may each be connected to a common shaft, said shaft mechanically connected to the flywheel.

Also in accordance with other embodiments of the present invention, the rotors of each of the motors/alternators are connected to each other to form the flywheel of the invention.

Furthermore in accordance with other embodiments of the present invention, the motors/alternators are each connected to an individual flywheel, whereas each of these flywheels are coupled to each other by shafts, gears, chains, belts and pulleys or other such mechanical connections means.

Also in accordance with embodiments of the present invention, the motors/alternators are each connected to an individual flywheel, whereas each of these flywheels are coupled to each other by gears resulting in a first portion of flywheel revolving counter clockwise and a second portion of flywheel revolving clockwise.

Various preferred embodiments include an apparatus for storing and releasing electrical energy, comprising: (a) a flywheel; (b) a plurality of charging unit sub-assemblies, each of said charging unit sub-assemblies comprising: at least one electrochemical accumulator adapted to store electrical energy; an electronic module connected to said at least one electrochemical accumulator; a motor, having a rotor and a stator, said motor being electrically connected to said electronic module, wherein said rotor of said motor is mechanically coupled to said flywheel and wherein said motor is adapted to: i) provide positive torque to said flywheel when being supplied by inputted electrical current from said electronic module, and said electronic module discharges said at least one electrochemical accumulator when having to supply said inputted electrical current by receiving a discharge current from said electrochemical accumulator; and ii) supply outputted electrical current to said associated electronic module, when being provided in torque from said flywheel, and said electronic module charges said electrochemical accumulator when being supplied by said outputted electrical current by supplying said electrochemical accumulator with a charge current; said electronic module is adapted to limit said charge currents and said discharge currents of said electrochemical accumulators; and (c) at least two external electrical connectors electrically connected to at least one of said charging unit sub-assemblies to allow charging and discharging of said electrical energy from said apparatus.

Preferred embodiments further include an apparatus for storing and releasing electrical energy, comprising: (a) a plurality of charging unit sub-assemblies, each of said charging unit sub-assemblies comprising: an electrochemical accumulator adapted to storing electrical energy; an electronic module connected to said electrochemical accumulator; a motor having a rotor and a stator, said motor being electrically connected to said electronic module; wherein said rotor from each charging unit sub-assemblies is connected to each other to form a flywheel; wherein said motor is adapted to provide torque to said flywheel when being supplied by inputted electrical current from said electronic module, and said electronic module discharges said at least one electrochemical accumulator when having to supply said inputted electrical current by receiving a discharge current from said at least one electrochemical accumulator; wherein said motor is adapted to supply outputted electrical current to said associated electronic module, when being provided in torque from said flywheel, and said electronic module charges said at least one electrochemical accumulator when being supplied by said outputted electrical current by supplying said at least one electrochemical accumulator with a charge current; further wherein said electronic module limits said charge currents and said discharge currents of said at least one electrochemical accumulator; and (b) at least two external electrical connectors electrically connected to at least one of said charging unit sub-assemblies to allow charging and discharging of electrical energy from the apparatus.

Various preferred embodiments may further comprise a power management unit setting said charge currents and said discharge currents for said at least one electrochemical accumulator by controlling said electronic module; and the apparatus may comprise at least one thermometer to measure temperature of each said at least one electrochemical accumulator, said at least one thermometer being connected to said power management unit, wherein said power management unit controls energy transfers to and from each said electrochemical accumulator to avoid overheating each of said electrochemical accumulator.

In some preferred embodiments, each of said charging unit sub-assemblies provides torque to said flywheel as a monotonic function of said electrical energy stored in said at least one electrochemical accumulator.

In some preferred embodiments each said electronic module limits stored energy in its associated electrochemical accumulator to a maximum level of energy, said maximum level of energy being determined independently for each electrochemical accumulator by measuring a set of parameters selected from a group consisting of said at least one electrochemical accumulator's voltage, capacity, state of charge, temperature and internal resistance value. Each said maximum level of energy may be determined to be the highest possible to maintain safe operation of the device. Furthermore, each said electronic module may limit stored energy in its associated electrochemical accumulator to a minimum level of energy, said minimum level of energy being determined to prevent over-discharge of said electrochemical accumulator.

Various preferred embodiments include: an apparatus described herein, wherein said at least one electrochemical accumulator comprised in each of said charging sub-assemblies is electrically connected to said at least one electrochemical accumulator comprised into other said charging sub-assemblies in a serial fashion, forming a battery of electrochemical accumulators having a negative terminal and a positive terminal; and wherein one of said at least two external electrical connectors may be electrically connected to said negative terminal while one other of said at least two external electrical connectors is electrically connected to said positive terminal of said battery of electrochemical accumulators; and/or an apparatus described herein, wherein the electronic module converts direct current from said at least one electrochemical accumulator into alternating current supplied to said electrical motor; or, alternatively, an apparatus described herein, wherein the electronic module transforms direct current coming from said at least one electrochemical accumulator at a first voltage into direct current supplied to said electrical motor at a second voltage being different than said first voltage; and/or an apparatus described herein, wherein said at least one electrochemical accumulator is a rechargeable battery comprising a plurality of electrochemical cells in series; and/or an apparatus described herein, wherein said at least one electrochemical accumulator is selected from the group consisting of lead-acid batteries, nickel-metal hydride batteries, lithium ion batteries and energy accumulating capacitors; and/or an apparatus described herein, wherein each rotor is mechanically coupled to said flywheel by a mechanical coupling system selected from a group consisting of shafts, gears, chains, belts and pulleys; and/or an apparatus described herein, wherein said flywheel further consists of a plurality of mechanically coupled rotating bodies.

Other preferred embodiments include the use of various apparatus described herein to store electrical energy from an external system by applying an electrical current through said external connectors of the apparatus; and/or the use of various apparatus described herein to release electrical energy to an external system by draining an electrical current from said external connectors of the apparatus; and/or the use of various apparatus described herein, wherein said apparatus comprises a plurality of electrochemical accumulators and whereas when at least one electrochemical accumulator is defective, said at least one defective electrochemical accumulator is disconnected from their associated electronic module, and said flywheel energy is used to maintain power supplied by said apparatus to said external electrical connectors when said apparatus is being discharged to the same amount of power as would be supplied by said apparatus if said defective electrochemical accumulators were not defective.

BRIEF DESCRIPTION OF THE FIGURES

For a fuller understanding of the nature, objects and advantages of the invention, reference should be made to the following detailed description cross-referencing as well with the drawings mentioned hereinafter.

It should be noted that the drawings may not be to scale and that components of the invention may be shown in a schematic form, for illustrative purposes only. Also, it should be noted that flywheels are illustrated as cylindrical shapes, but other shapes may be used, as a person skilled in the art would understand.

DETAILED DESCRIPTION OF PREFERRED EMBODIMENTS

Figure 1:
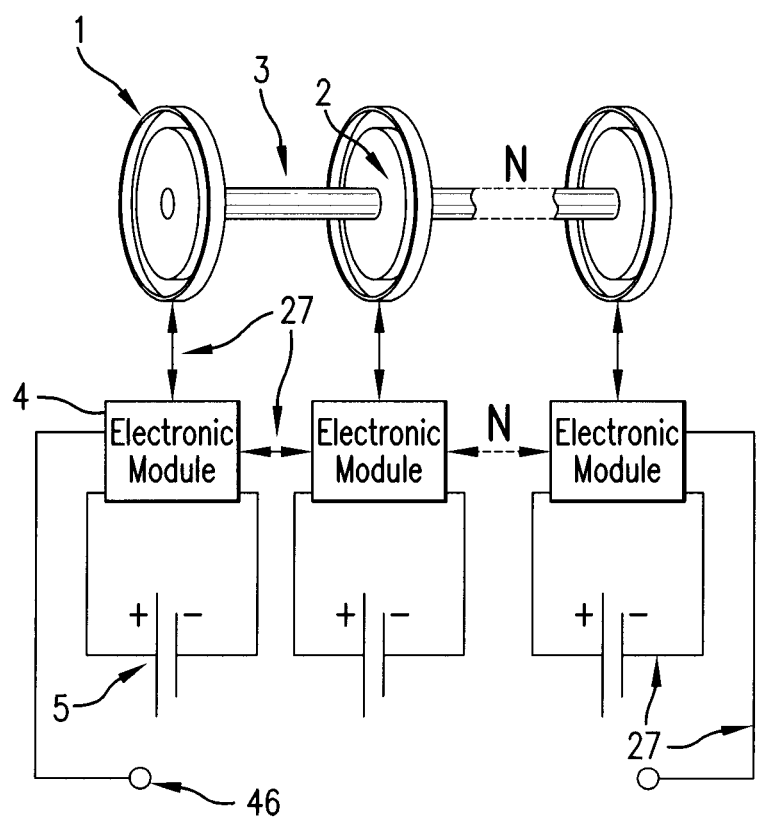
FIG. 1 is a schematic illustration of one embodiment of the invention whereas rotors of a plurality of motors/alternators are connected to each other by a shaft, said assembly of rotors and shafts forming the flywheel of the invention.

FIG. 1 is a schematic illustration of a preferred embodiment of the invention whereas rotors of a plurality of an electrical machine (a motor which reversibly acts as an alternator) are connected to each other by a shaft, said assembly of rotors and shafts forming the flywheel of the invention. In this embodiment, a subassembly comprising a single cell or a plurality of cells (constituting a battery which is a sub-assembly of the overall battery of the invention) (5), where each cell, or group of cells, (5) among a plurality of N batteries is electrically connected to an electronic module (4), which module (4) converts the battery voltage into a voltage and a current adapted to the stator (1) of an electrical machine, which voltage and current are formatted so that said electrical machine produces a positive or negative torque on its shaft at a chosen speed. In this embodiment, each said electrical machine among a plurality of N electrical machines has a stator (1) and a rotor (2), which rotor (2) is mechanically attached to the rotor (2) of the immediately adjacent electrical machine via a mechanical link (3). In this embodiment, said N rotors (2) are allowed to rotate around a common axis, forming a rotational inertia, which inertia can be brought to a given rotational speed, providing a means to store and release energy. Said N rotors (2) are located at the inner portion of said electrical machines, whereas said stators (1) are located at the outer portion of said electrical machines.

As can be understood by a person skilled in the art, the modules are electrically connected (27) to each other, to said electrical machine and to the cells, through means of transporting electrical power, including, without limitations, wires, metal pieces and/or printed circuit boards. Furthermore, such embodiment of the invention can be connected to one or a plurality of electrical devices which draw or input power to the invention through external electrical connectors (46), such as, without limitations, wires, conductive metal pieces and/or printed circuit boards.

Figure 2:
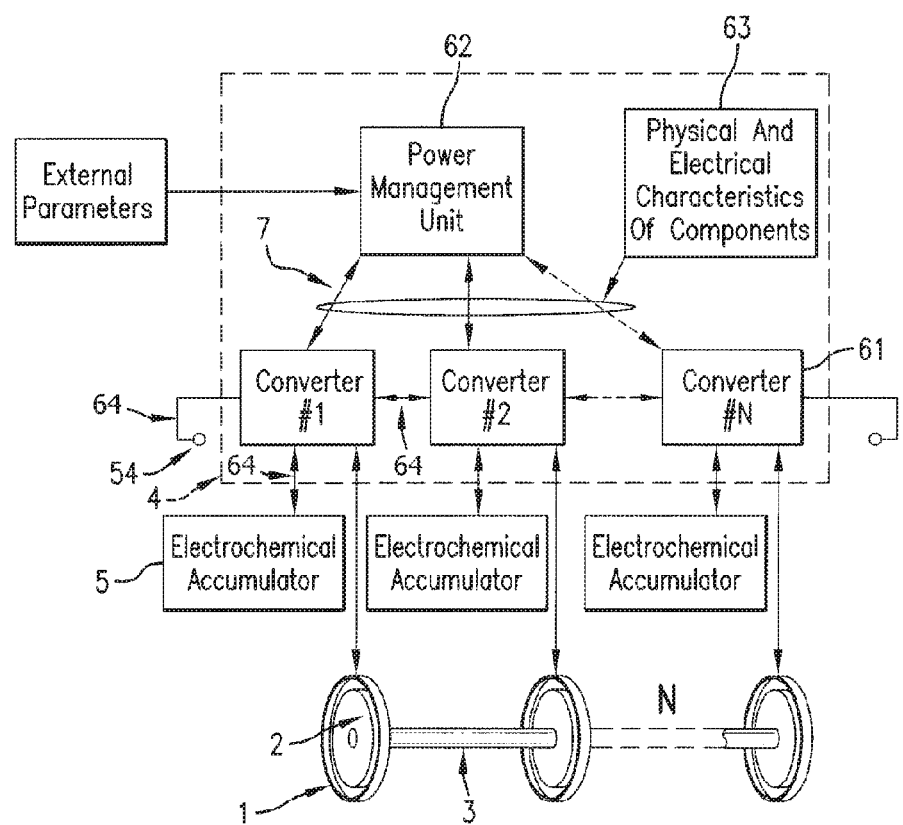
FIG. 2 shows a schematic diagram of the operation of the invention in embodiments which include converters and a power management unit.

FIG. 2 shows a schematic diagram of the operation of the invention in the same embodiment as FIG. 1, which include DC/AC converter modules (61) and a power management unit (which can be an embedded algorithm or an electronic sub-assembly) (62). For the purpose of the description of this invention, the same parts of an embodiment of the invention appearing in more than one figure are designated by the same reference number. To achieve the equalization and dampening functions, this invention is constituted of N cells individually connected to N kinetic energy storage systems (flywheels). Each kinetic storage system comprises a stator and a rotor. Each stator is electrically connected to its cell and can exchange energy flows. The N rotors are mechanically close coupled to form a unique flywheel and/or are mechanically close coupled to such. Each kinetic storage system forms a motor-alternator assembly. By varying the rotation speed of this assembly, energy can be stored and exchanged with the load ($E_r=\frac{1}{4}p\pi thR^4\omega^2$). Real time energy flow management is achieved by monitoring the physical and electrical characteristics of the N cells. When a cell or a plurality of cells is not showing similar characteristics among the string, the system proceeds to an energy exchange between cells. Applying positive or negative torque on the rotors assembly will increase or decrease its energy. A fully charged cell would apply a positive torque (motor behaviour) while a low charged cell would apply a negative torque (alternator behaviour) resulting in a net energy exchange thus a global string active equalization. In this schematic description of this preferred embodiment, electrical links (64), such as a wires, conductive metal pieces or printed circuits, carry the electrical power to and from the device and are interface to one or a plurality of external electrical devices by external electrical connectors (54). Furthermore, physical and electrical characteristics of each cell are measured, such as the cells's voltage, capacity, state of charge, temperature and internal resistance value, through the use of thermometers and various electrical measurement devices. This information (63) is fed to the power management unit (62) for optimizing the maximal energy stored in the apparatus and the lifespan of the cells.

Alternatively, an embodiment which includes DC to DC converter modules and a power management unit would be possible, such DC to DC converter module replacing the DC/AC converter in the above described FIG. 2. In such embodiment, converter modules would control the input and output voltage and current between each cells and their associated electrical machine. Said modules can further include switches, transformers and other electric circuitries known in the art.

Figure 3:
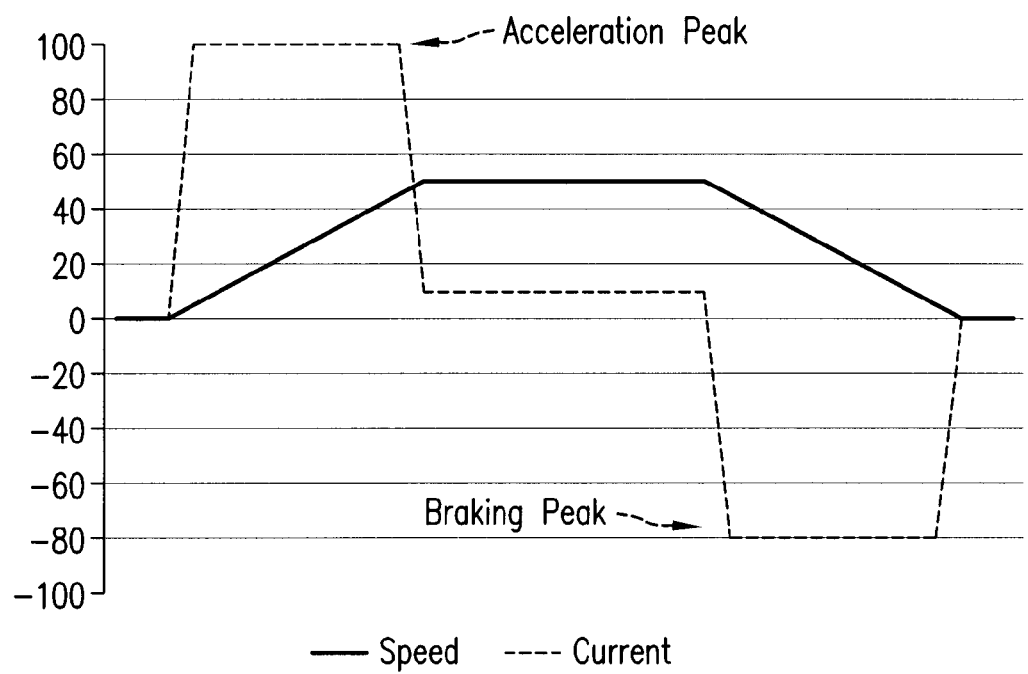
FIG. 3 shows a graphical representation of the speed of the flywheel alongside associated with current load on the battery of cells in case of acceleration and deceleration of a hybrid automotive vehicle utilizing the invention.

FIG. 3 shows a graphical representation of the speed of the flywheel alongside associated with current load on the battery of cells in case of acceleration and deceleration of a hybrid automotive vehicle utilizing the invention; this kind of behaviour of current load on a battery is a typical vehicular application, such as hybrid cars and other hybrid vehicles. The connected load dynamic behaviour presents peaks during vehicle acceleration and during dynamic regenerative breaking, as well as average demand. To prevent early deterioration of the cells, high current flows must be avoided. The kinetic storage assembly is designed to absorb and deliver such peak power demands while cells are drained at a constant rate within their limit of capacity. In that arrangement, all cells are optimally used, preventing their early deterioration. Since batteries are not well suited for energy absorption, the invention assures an efficient energy transfer between the load and the energy storage system in recovery braking mode. Also, cells are power limited in discharge mode. This limitation can be overcome by «charging» the kinetic energy storage assembly at a slow rate from the cells and suddenly discharge it at a high rate thus achieving higher power capacities than the cells alone. Other applications where batteries are subject to peaks of loads, whether only high peaks, only low peaks, or a combination of both high and low peaks, would benefit of the present invention.

Figure 4:
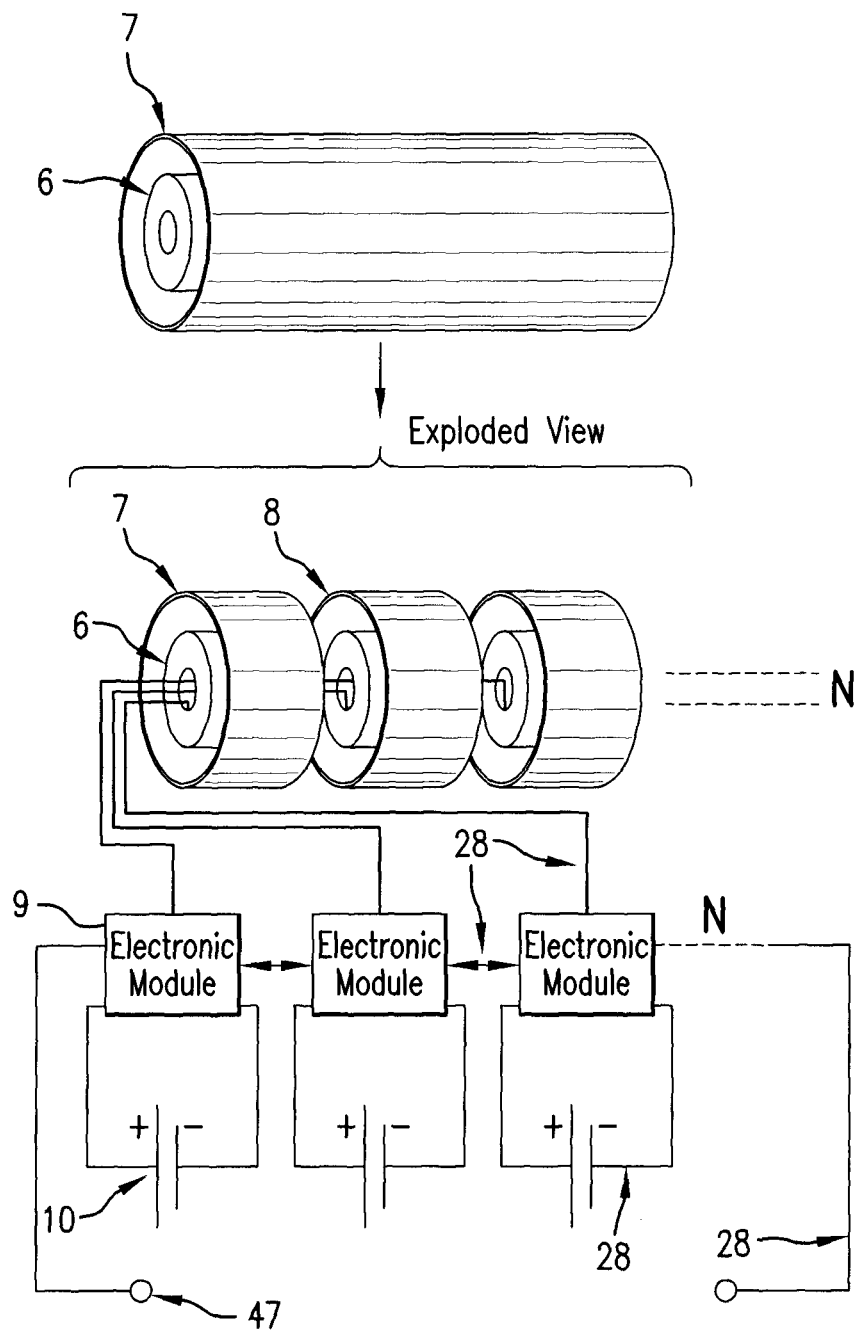
FIG. 4 is a schematic illustration of one embodiment of the invention, whereas rotors of the motors/alternators are positioned around the stators, in a manner such that these rotors form a flywheel revolving on the outer portion of the motors/alternators.

FIG. 4 is a schematic illustration of another preferred embodiment of the invention, whereas rotors of the electrical machines (motors which reversibly act as alternators) are positioned around the stators, in a manner such that these rotors form a flywheel revolving on the outer portion of the motors/alternators. In this second embodiment, the N rotors (7) are located at the outer portion of the N electrical machines, whereas the N stators (6) are positioned at the inner portion of said electrical machines. In this embodiment, said N rotors are joined together by the means of external mechanical links (8), forming a rotational inertia which, upon rotation of the N rotors, will accumulate energy or release energy. In this embodiment, each of said N stators (6) is connected to an electronic module (9) with electrical conductors, which supply voltage and current to the inner stator (6). Each module is connected to a cell, or group of cells (10). In this schematic illustration, electrical power carrying elements (28), such as wires, metal pieces and printed boards electrically connect the components of the devices (electrical machines, modules, cells) to each other and to external electrical connectors (47).

Figure 5:
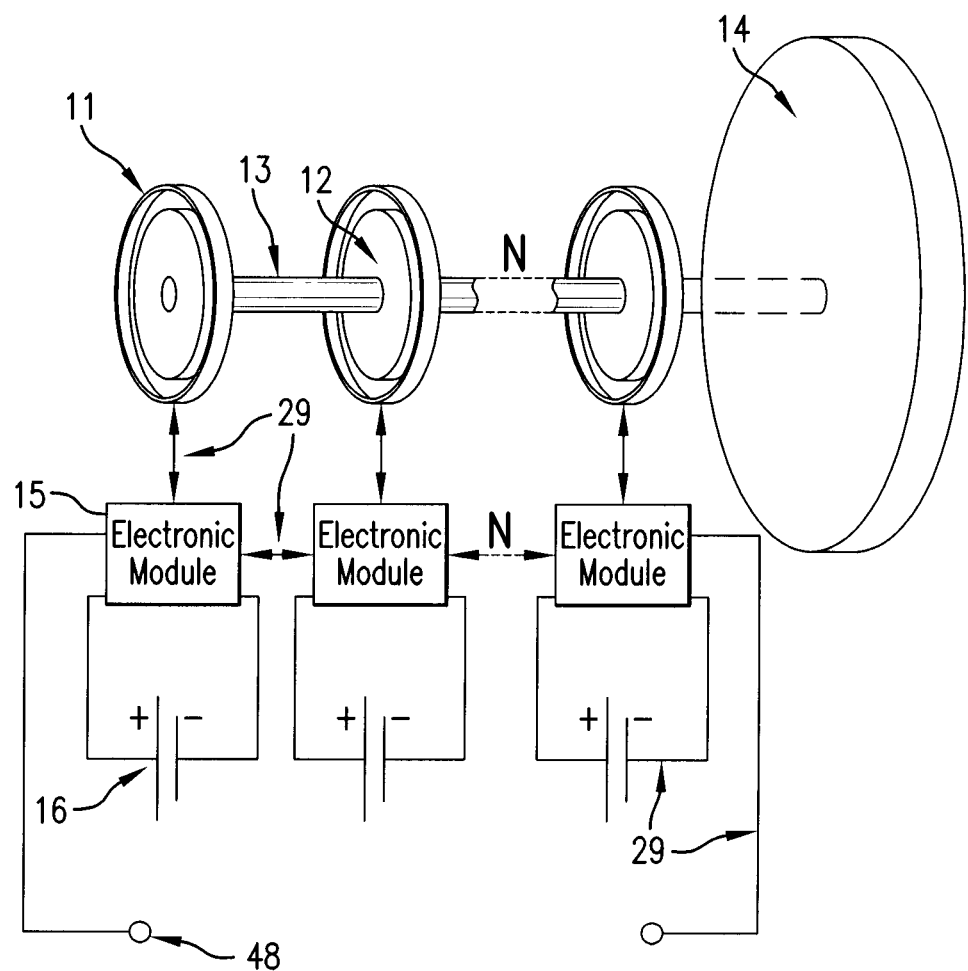
FIG. 5 is a schematic illustration of one embodiment of the invention whereas rotors of a plurality of motors/alternators are connected to each other by a shaft, said shaft driving a flywheel axially centered alongside on the shaft.

FIG. 5 is a schematic illustration of yet another preferred embodiment of the invention whereas rotors of a plurality of electrical machines (motors which reversibly acts as alternators) are connected to each other by a shaft, said shaft driving a flywheel axially centered alongside on the shaft. Each electrical machine comprises a rotor (12) and a stator (11). In this embodiment of the invention, a rotating body (14) has its rotational axis centered on the rotational axis of the rotor (12) of the electrical machine. The rotating body (14) is mechanically attached to said rotor (12), via a mechanical link (13) and has the same rotational speed as all N rotors. The rotating body (14) has a size and a shape which may or may not be different from the size and shape of the rotors (12). In a preferred configuration of this third embodiment, the moment of inertia of the rotating body (14) is greater than the moment of inertia of a single rotor (12) of the electrical machine. Each stator is connected to a module (15), and each module is connected to a cell, or group of cells (16). In this schematic illustration, electrical power carrying elements (29) connect the components of the devices (electrical machines, modules, cells) to each other and to external electrical connectors (48).

Figure 6:
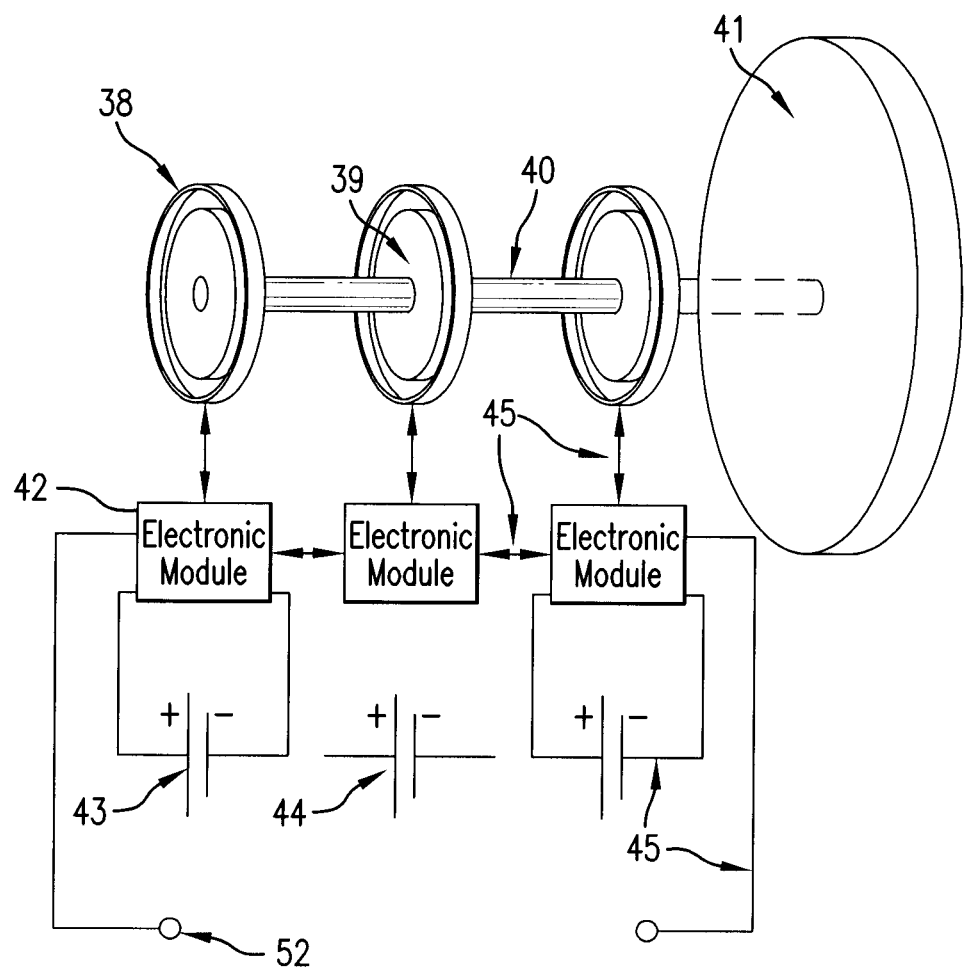
FIG. 6 is a schematic illustration of another operation of the invention in the same embodiment as in FIG. 5 working with a failed cell.

FIG. 6 shows a schematic diagram of the operation of the invention in a similar embodiment as FIG. 5, which includes a failed or defective cell (44) disconnected from its associated electronic module (42). For example, if one cell is a defective cell (44), the other motor/alternators (38) connected to cells which are not defective (43) can induce and maintain rotation of the rotor (39) which is connected to the defective cell (44). In such case, the motor/alternator associated with the defective cell (44) generates a voltage and a current which simulates the presence of the defective cell into the battery of cells. Therefore, even if the defective cell is disconnected, the arrangement allows the battery to be operated at a total normal voltage (close or equal to the voltage in the situation in which all cells are connected and non-defective), from the perspective of the external connection (52). As an example, if a battery has 100 cells (each providing 3 V) and 20 of them become defective, the DC voltage of the battery may go down from 300 V to 240 V. With this invention, the energy capacity of the battery corresponds to the sum of the energy of all non-defective cells (80% residual energy, since 20 of the 100 cells are disconnected). If the maximum power supplied by the cells is 1 kW and the flywheel (41) allows 5 kW of additional power through conversion by the electronic modules (42), then the maximal power supplied by the invention should be 6 kW without any defective cells. With 20% of defective cells, this amount is equal to 80% of 1 kW plus 5 kW, for a total of 5.8 kW. Therefore, it is possible with this invention to maintain for a period of time the power outputted to the external connectors (52) at any value inferior to 5.8 kW (for example, 1 kW to be equal to the maximum capacity of the battery without this invention), even the battery itself would be limited only to 0.8 kW. With this invention, the power can be therefore maintained thus avoiding a voltage loss which would impair, for example, the operation of an external inverter, such as an inverter for electrical vehicles with a low voltage protection. In this schematic illustration, electrical power carrying elements (45) connect the components of the devices (electrical machines, modules, cells) to each other and to external electrical connectors (52). Furthermore, the rotors are linked together and with the flywheel (41) through a mechanical link (40), which may remain connected for the rotor (39) corresponding to the defective cell (44). For illustrative purposes, this figure shows three electrical machines and three electronic modules. However, as can be understood by a person skilled in the art, this embodiment could comprise any N number of cells greater than one, as described for FIG. 5 hereinabove.

Figure 7:
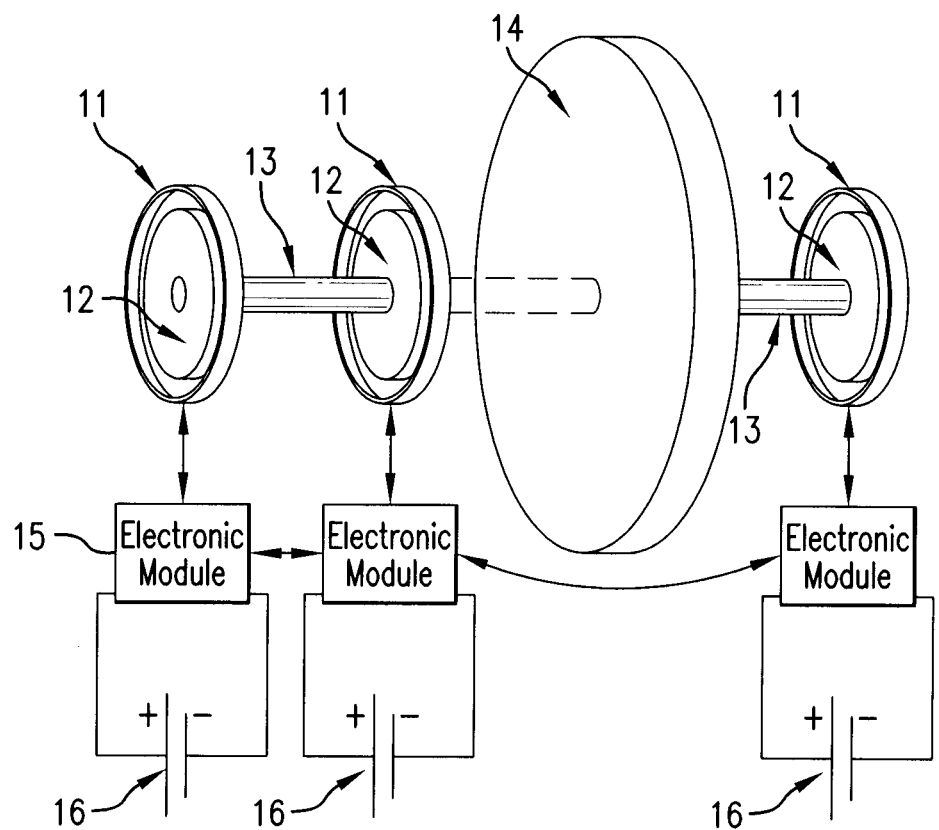
FIG. 7 is a schematic illustration of another embodiment of the invention whereas rotors of a plurality of motors/alternators are connected to each other by a common shaft, said shaft driving a flywheel axially centered alongside on the shaft and located between the motors.

FIG. 7 is a schematic illustration of a preferred embodiment which is a variation of the embodiment described in FIG. 5, whereas the rotating body (14) is positioned between the sets of motors on the common shaft. Generally the rotating body (14) can be positioned on any end of the shaft or at any other suitable position as required by the system design. The position of the rotating body should take into consideration the stability of the system and the vibration of the system. For illustrative purposes, this figure shows three electrical machines and three electronic modules. However, as can be understood by a person skilled in the art, this embodiment could comprise any N number of cells greater than one, as described for FIG. 5 hereinabove.

Figure 8:
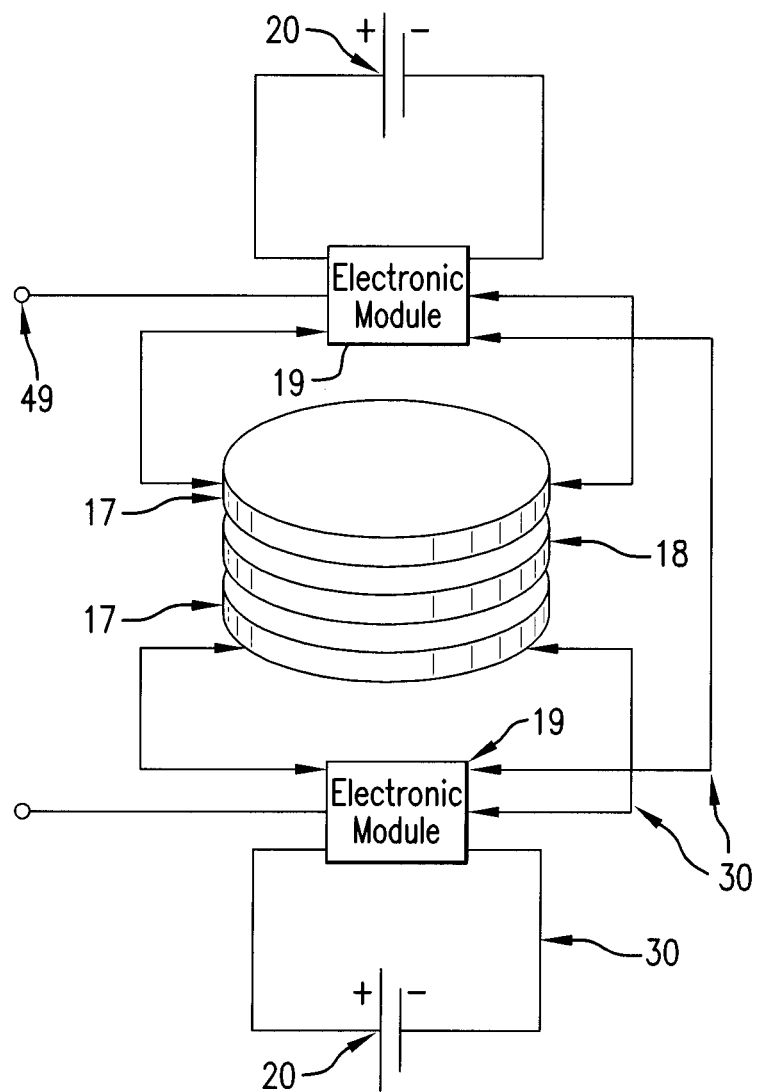
FIG. 8 is a schematic illustration of one embodiment of the invention, whereas a rotor forming the flywheel is inserted in between two stators, thus serving as a common rotor and flywheel for two stators, each of said stator being connected to a distinct converter module and cell.

FIG. 8 is a schematic illustration of yet another embodiment of the invention, whereas a rotor forming the flywheel is inserted in between two stators, thus serving as a common rotor and flywheel for two stators, each of said stator being connected to a distinct converter module and cell. In this embodiment of the invention, each of the rotors (18) and stators (17) of the electrical machines are built so that the magnetic fields created by said rotors (18) and stators (17) are oriented in a direction mainly parallel to the rotational axis of said rotors (18). Each electronic module (19) among a plurality of N electronic modules, is connected to a number S of stators (17), where S is an integral number, equal or non-equal to N. Each electronic module is also connected to a cell or a group of cells, such as electrochemical accumulators (20). Several other configurations wherein rotors are inserted in between stators, so that the magnetic fields created by said rotors and stators are oriented in a direction mainly parallel to the rotational axis of said rotors, can be understood by a person skilled in the art. The number of rotors would then be equal to R, where R can be equal to S/2 or S or 2S, depending on the configuration of rotors and stators assembly. In this schematic illustration, electrical power carrying elements (30) connect the components of the devices (electrical machines, modules, cells) to each other and to external electrical connectors (49).

Figure 9:
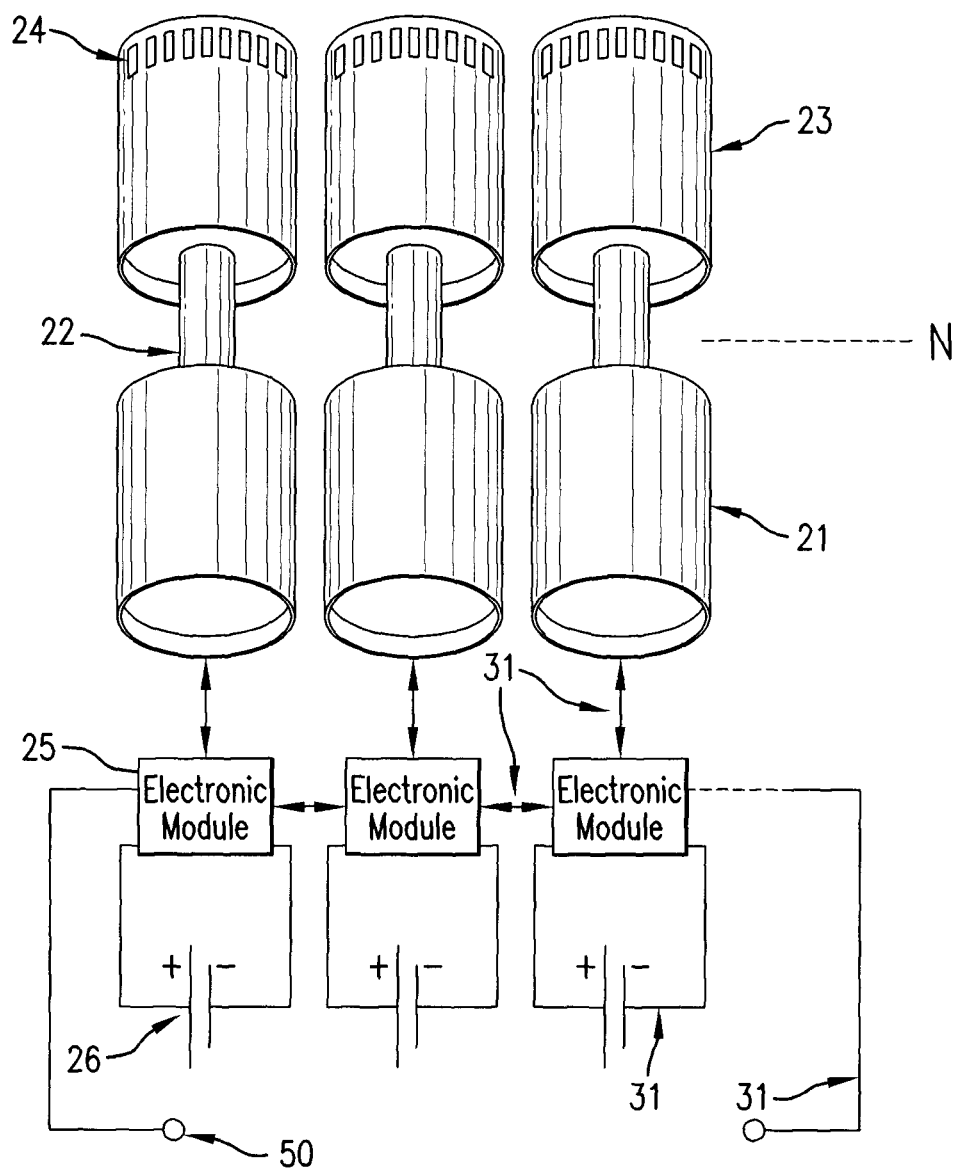
FIG. 9 is a schematic illustration of one embodiment of the invention whereas rotors of a plurality of motors/alternators are connected to a plurality of flywheel components, each of these flywheel components being connected to another flywheel component by gears, thus having at least a portion of the flywheel components revolving clockwise, and the remaining flywheel components revolving counter clockwise.

FIG. 9 is a schematic illustration of one preferred embodiment of the invention whereas rotors of a plurality of electrical machines (motors which reversibly acts as alternators) are connected to a plurality of flywheel components, each of these flywheel components being connected to another flywheel component by gears, thus having at least a portion of the flywheel components revolving clockwise, and the remaining flywheel components revolving counter clockwise. In this embodiment of the invention, a subassembly comprising a single cell or a plurality of cells (constituting a battery which is a sub-assembly of the overall battery of the invention) (26), where each cell, or group of cells, (26) is connected to an electronic module (25), which module (25) converts the battery voltage into a voltage and a current adapted to a motor/alternator (21), which voltage and current are formatted so that said motor/alternator (21) produces a positive or negative torque on its shaft at a chosen speed. Each said motor/alternator among a plurality of N motor/alternator (21) has a rotor which is mechanically attached to a flywheel component (23) via a mechanical link (22). In this embodiment, the number of flywheel components (23) having a clockwise rotational direction is equal to C, where C is an integral number, which is lower than N. The number of flywheel components (23) having a counter clockwise rotational direction is equal to (N−C). The exchange of mechanical power from one flywheel component with clockwise rotational direction, to one adjacent flywheel component with counter clockwise rotational direction is made possible with the means of a gear (24) located on the clockwise rotating flywheel component and a gear located on the counter clockwise rotating flywheel component. In this embodiment, the plurality of flywheel components connected by gears form the effective flywheel of the apparatus. Therefore, the rotational energy of the flywheel in this embodiment is distributed between all of said flywheel components. In this schematic illustration, electrical power carrying elements (31) connect the components of the devices (electrical machines, modules, cells) to each other and to external electrical connectors (50).

Figure 10:
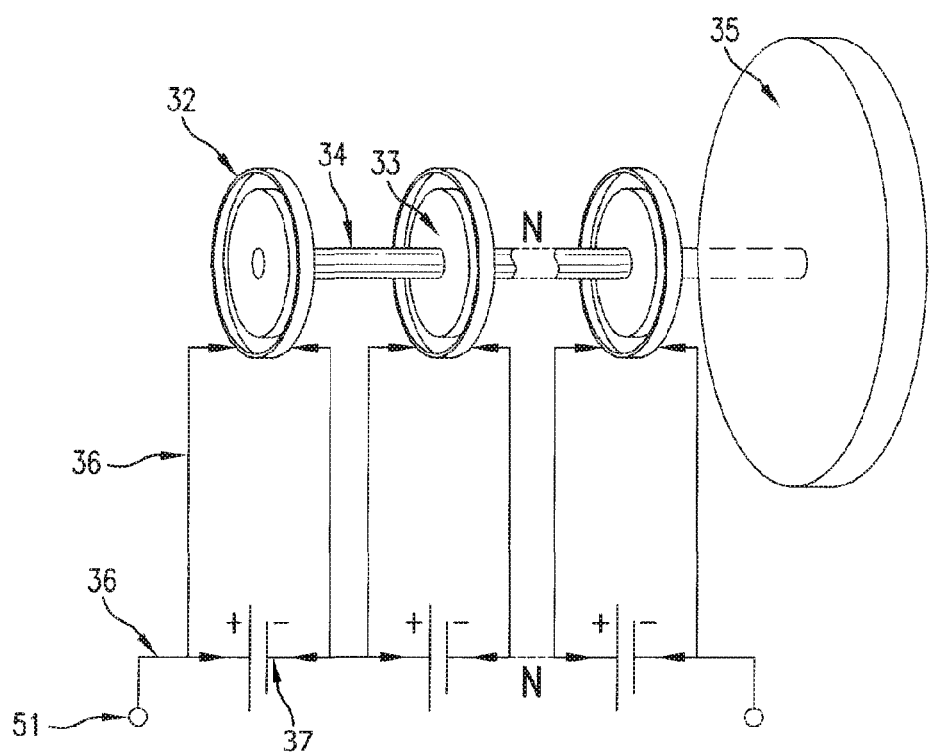
FIG. 10 is a schematic illustration of another preferred embodiment of the invention, whereas stators of the DC electrical machines (motors which reversibly act as alternators) are connected directly to a cell or a group of cells and the N rotors are joined together by the means of external mechanical links.

FIG. 10 is a schematic illustration of another preferred embodiment of the invention, whereas stators of the DC electrical machines (motors which reversibly act as alternators) are connected directly to a cell (37) or a group of cells. In this second embodiment, the N rotors (33) are joined together by the means of external mechanical links (34), forming a rotational inertia which, upon rotation of the N rotors, will accumulate energy or release energy. The N rotors (33) may be connected to an external flywheel (35) to add inertia to the said N rotors by the means of a mechanical link, as the case may be. In this embodiment, each of said N stators (32) is connected to each of said cell (37) or group of cells with electrical conductors, which supply voltage and current to the stator (32). In this schematic illustration, electrical power carrying elements (36), such as wires, metal pieces and printed boards electrically connect the components of the devices (electrical machines, modules, cells) to each other and to external electrical connectors (51).

Figure 11:
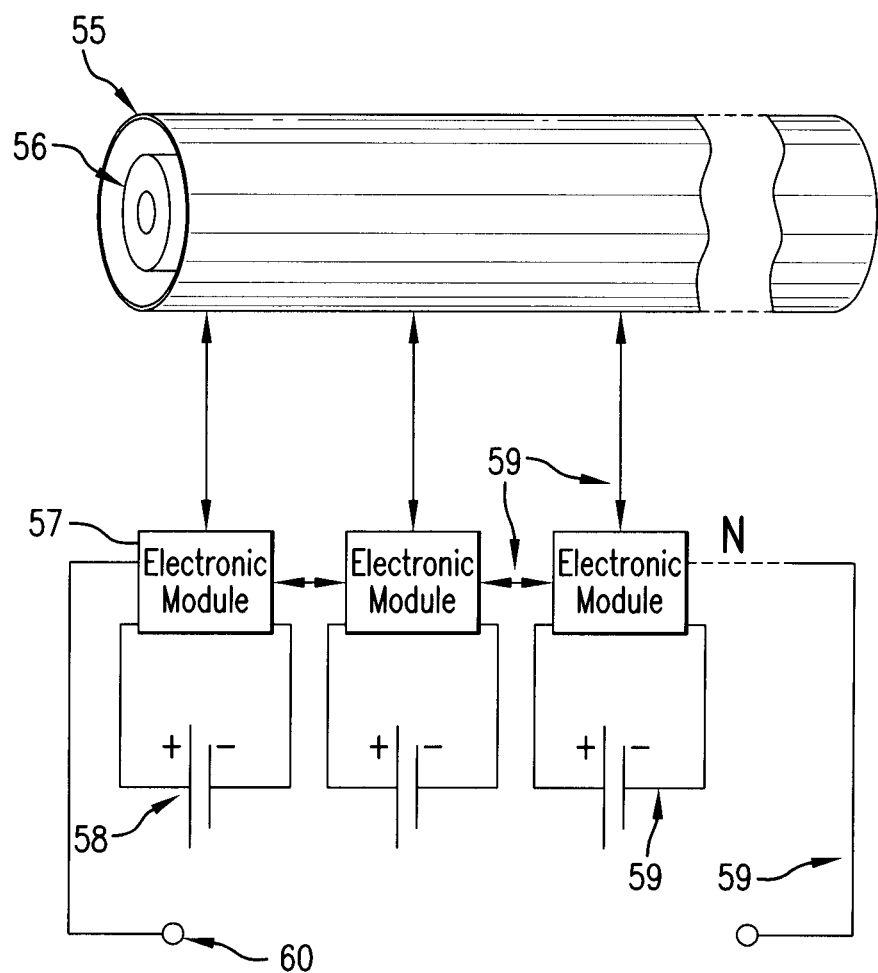
FIG. 11 is a schematic illustration of yet another preferred embodiment of the invention whereas the N electronic modules are connected to N individual windings embedded in a single electromagnetic body, the stator.

FIG. 11 is a schematic illustration of yet another preferred embodiment of the invention whereas the N electronic modules (57) are connected to N individual windings embedded in a single electromagnetic body, the stator (55). In this embodiment of the invention, each independent electrical winding is forming an independent rotating magnetic field, thus may act as a motor or alternator in the same manner as if each said independent winding would have its independent stator. In this embodiment of the invention, the rotor (56) is used to store and release rotational kinetic energy and exchange power from an electronic module (57) to another with the electrical power carrying elements (59) thus balancing the cells or groups of cells (58). In this schematic illustration, electrical power carrying elements (59), such as wires, metal pieces and printed boards electrically connect the components of the devices (electrical machines, modules, cells) to each other and to external electrical connectors (60).

As can be understood by a person skilled in the art, the external source of energy for rotation of the flywheel can be, in various preferred embodiments, other than kinetic energy from the flywheel. For example, in another preferred embodiment, a first motor/alternator is powered by a cell and can be the source of energy of a second motor/alternator, said second motor/alternator acting as a receptor of energy. To transfer the kinetic energy in rotational energy, there is a variation of the rotational speed (revolutions per unit of time) of the flywheel. If the rotational speed is maintained constant, energy can be effectively transferred from one cell to another without subtracting energy from the flywheel itself. Conversely, the source of energy may also be only kinetic, i.e. only the flywheel is the source of energy of the said second motor at a given time, and therefore this second motor is the receptor of energy while no other motors contribute to supply rotational energy to this second motor. Any combination of the above two situations is also possible, with the energy inputted to a motor/alternator coming partly from the flywheel and partly from another motor.

Finally, in several preferred embodiments, this invention uses a plurality of electronic modules, which are each connected with an electrochemical accumulator. Each of these electronic modules is able to control and limit the maximum or the minimum amount of energy stored in the associated electrochemical accumulator. Therefore, in order to store the maximum amount of energy in the apparatus, each said electronic module can limit the stored energy in its associated electrochemical accumulator to a maximum level of energy, said maximum level of energy being determined independently for each electrochemical accumulator.

Furthermore, it is well known that over-discharge of an electrochemical accumulator may damage or reduce the useful life of such accumulator. In order to prevent over-discharge of said electrochemical accumulator, each electronic module can limit the stored energy in its associated electrochemical accumulator to a minimum level of energy, said minimum level of energy being determined independently for each electrochemical accumulator.

Therefore, an optimal level of energy is achieved for each electrochemical accumulator, which may differ from one accumulator to another accumulator. In order to determine this optimal level, the electronic module may measure a set of parameters, including, without limitation, said electrochemical accumulator's voltage, capacity, state of charge, temperature and internal resistance value. Overall health of the battery may be taken into consideration. Therefore each electronic module may determine, based on these parameters, the optimal (maximum and/or minimum) charge that can be stored in each electrochemical accumulator to operate the invention safely and/or extend the life of the associated electrochemical accumulators. By such process, each electrochemical accumulator can be operated safely, i.e. without risk of explosion, fire, leakage (in case of liquid-containing accumulators) or rapid degradation of performances.

For each electrochemical accumulator, the electronic module may control the above optimal charge boundaries through the use of a power management algorithm embedded in the electronic module or in the power management unit, or alternatively through a dedicated electronic sub-assembly (a power management module) which could be either physically integrated within the electronic module, or constitute a separate power management sub-assembly controlling the electronic module operations.

What is claimed is:

1. An apparatus for storing and releasing electrical energy, comprising:
    a plurality of charging unit sub-assemblies, each of said charging unit sub-assemblies comprising:
        at least one electrochemical accumulator adapted to store electrical energy;
        an electronic module connected to said at least one electrochemical accumulator;
        a motor, having a rotor and a stator, said motor being electrically connected to said electronic module,
    a flywheel, said flywheel being one of
        mechanically coupled to said rotor of said motor of each charging unit sub-assembly of said plurality; and
        formed by an interconnection of said rotor of said motor of said plurality of charging unit sub-assemblies;
    at least two external electrical connectors electrically connected to at least one of said charging unit sub-assemblies to allow charging and discharging of said electrical energy from said apparatus; and
    a power management unit individually setting a charge current and a discharge current for each of said at least one electrochemical accumulator by controlling said electronic module using a set of parameters of said at least one electrochemical accumulator selected from a group consisting of a voltage, a capacity, a state of charge, a charging rate, a discharge rate, a temperature and an internal resistance value;
    said motor being adapted to:
        provide positive torque to said flywheel when being supplied by inputted electrical current from said electronic module; and
        supply outputted electrical current to said electronic module, when being provided with torque from said flywheel,
    said electronic module being adapted to:
        discharge said at least one electrochemical accumulator when supplying said inputted electrical current by receiving said discharge current from said electrochemical accumulator; and
        charge said electrochemical accumulator when being supplied by said outputted electrical current by supplying said electrochemical accumulator with said charge current.

2. The apparatus of claim 1, wherein said power management unit individually limits said electrical energy in each of said at least one electrochemical accumulator to at least one of a maximum level of energy and a minimum level of energy, said maximum level of energy being set to a maximum to maintain safe operation of the device, said minimum level of energy being set to a minimum to prevent over-discharge of each of said at least one electrochemical accumulator.

3. The apparatus of claim 1, further comprising at least one thermometer to measure temperature of each said at least one electrochemical accumulator, said at least one thermometer being connected to said power management unit, wherein said power management unit controls energy transfers to and from each said electrochemical accumulator to avoid overheating each of said electrochemical accumulator.

4. The apparatus of claim 1, wherein each of said charging unit sub-assemblies provides torque to said flywheel as a monotonic function of said electrical energy stored in said at least one electrochemical accumulator.

5. The apparatus of claim 1, wherein said at least one electrochemical accumulator in each of said plurality of charging unit sub-assemblies are electrically interconnected in a serial fashion, forming a battery of electrochemical accumulators.

6. The apparatus of claim 5, wherein said battery has a negative terminal and a positive terminal, wherein one of said at least two external electrical connectors is electrically connected to said negative terminal and one other of said at least two external electrical connectors is electrically connected to said positive terminal of said battery of electrochemical accumulators.

7. The apparatus of claim 1, wherein said discharge current is a direct discharge current and said inputted electrical current is an alternating inputted electrical current and wherein said electronic module converts said direct discharge current from said at least one electrochemical accumulator into said alternating inputted electrical current supplied to said electrical motor.

8. The apparatus of claim 1, wherein said discharge current is a direct discharge current at a first voltage and said inputted electrical current is a direct inputted electrical current at a second voltage, said first voltage being different from said second voltage and wherein said electronic module transforms said direct discharge current coming from said at least one electrochemical accumulator into said direct inputted electrical current supplied to said electrical motor.

9. The apparatus of claim 1, wherein said at least one electrochemical accumulator is a rechargeable battery comprising a plurality of electrochemical cells connected in one of a series and a parallel fashion.

10. The apparatus of claim 1, wherein said at least one electrochemical accumulator is selected from the group consisting of lead-acid batteries, nickel-metal hydride batteries, lithium ion batteries and energy accumulating capacitors.

11. The apparatus of claim 1, wherein said flywheel is mechanically coupled to said rotor by a mechanical coupling system selected from a group consisting of shafts, gears, chains, belts and pulleys.

12. The apparatus of claim 1, wherein said flywheel is mechanically coupled to said rotor and wherein said flywheel further consists of a plurality of mechanically coupled rotating bodies.

13. The use of the apparatus of claim 1 to store external electrical energy from an external system by applying an external electrical current through said external connectors of the apparatus, thereby supplying said external electrical current to said electronic module and charging said apparatus.

14. The use of the apparatus of claim 13,
wherein said apparatus comprises a plurality of electrochemical accumulators,
wherein said power management unit is adapted to
detect that a defective electrochemical accumulator of said plurality is defective;
disconnect said defective electrochemical accumulator from said electronic module;
whereby said external electrical current is supplied to said electronic module regardless of said detection of said defective electrochemical accumulator.

15. The use of the apparatus of claim 1 to release said electrical energy to an external system by draining an outputted electrical current from said external connectors of the apparatus, thereby discharging said apparatus.

16. The use of the apparatus of claim 15,
wherein said apparatus comprises a plurality of electrochemical accumulators,
wherein said power management unit is adapted to
detect that a defective electrochemical accumulator of said plurality is defective;
disconnect said defective electrochemical accumulator from said electronic module;
maintain said outputted electrical current by controlling said electronic module;
whereby said outputted electrical current is supplied to said external system regardless of said detection of said defective electrochemical accumulator.

17. The apparatus of claim 1, wherein said said interconnection of said rotor of said said motor of each charging unit sub-assemblies is provided by a single rotor common to all said charging unit sub-assemblies and wherein said stator of each charging unit sub-assemblies is an individual electrical winding embedded in a single electromagnetic body for all said charging unit sub-assemblies.

18. The apparatus of claim 1, wherein said electronic module is adapted for measuring at least one electrical characteristic of said at least one electrochemical accumulator, said at least one electrical characteristic being selected from a group consisting of said voltage, said capacity, said state of charge, an output current and said internal resistance value of said at least one electrochemical accumulator.

19. The apparatus of claim 18,
wherein said electronic module is adapted for
measuring said output current of each of said at least one electrochemical accumulator;
wherein said power management unit is further adapted for
determining an average output current of said plurality of charging unit sub-assemblies using said output current measured by said electronic module, said average output current corresponding to an average of said output current;
said individually setting of said charge current and said discharge current by said power management unit uses said output current and said average output current to ensure that ones of said plurality of charging unit sub-assemblies with said output current higher than said average output current provide a kinetic energy input higher than an average kinetic energy input to said flywheel, while other ones of said plurality of charging unit sub-assemblies with said output current lower than said average output current provide said kinetic energy input lower than said average kinetic energy input to said flywheel.

20. The apparatus of claim 19, wherein some of said other ones of said plurality of charging unit sub-assemblies provide negative torque to said flywheel, said motor acting as an alternator recharging said some of said other ones of said plurality of charging unit sub-assemblies, said ones of said plurality of charging unit sub-assemblies with a higher than average output current effectively charging said some of said other ones of said plurality of charging unit sub-assemblies providing negative torque, whereby said state of charge of said charging unit sub-assemblies is equalized over time.

* * * * *